United States Patent
Hundhausen et al.

[15] 3,684,321
[45] Aug. 15, 1972

[54] COUPLING FOR TUBES

[72] Inventors: Eckhard Hundhausen, Margarethenstr. 21, 6242 Schonberg; Karl-Heinz Hoffmann, Birkenweg 29, 5904 Eiserfeld, both of Germany

[22] Filed: Sept. 15, 1970

[21] Appl. No.: 72,280

[30] Foreign Application Priority Data

Sept. 22, 1969 Germany..........P 19 47 939.1

[52] U.S. Cl..................285/316, 339/91 P, 285/319, 285/423
[51] Int. Cl.............................................F16l 37/18
[58] Field of Search........285/316, 319, 322, 86, 423, 285/276, 315; 339/91 P

[56] References Cited

UNITED STATES PATENTS

| | | | |
|---|---|---|---|
| 2,727,759 | 12/1955 | Elliott | 285/322 X |
| 2,877,437 | 3/1959 | Flanagan | 339/91 P |
| 2,951,713 | 9/1960 | Hoffstrom | 285/322 X |
| 3,435,848 | 4/1969 | Johnston | 285/286 X |

*Primary Examiner*—Dave W. Arola
*Attorney*—Ostrolenk, Faber, Gerb & Soffen

[57] ABSTRACT

A hose coupling comprises a male part and a female part with collet-like fingers held by a sliding sleeve. Two sorts of fingers are provided: one sort for engaging the male part and another sort for acting on the sleeve.

11 Claims, 9 Drawing Figures

COUPLING FOR TUBES

The present invention relates to plug-in couplings for garden and other hoses.

The invention consists in a plug-in coupling for hoses comprising a female part and a male part, a number of resilient holding fingers provided on the female part and adapted, in the connection condition of the coupling to fit behind a shoulder on the male part, which is conical, an external sliding sleeve arranged to hold the fingers in this position in which they engage the shoulder, the holding fingers having external oblique faces for cooperation with at least one oblique face in the sliding sleeve for causing the sliding sleeve to be driven back somewhat on doing up the coupling with a radical displacement of the fingers in an outward direction to make possible the introduction of the male part, only one group of the holding fingers provided having external oblique faces for cooperation with the inner oblique face of the sliding sleeve, these fingers, termed driving fingers, not having external retaining projections.

With such a construction in which for example there are in all eight holding fingers of which four fingers are adapted to act as driving fingers and alternate with the remaining fingers, there is a guarantee that the coupling will not be forced apart by water pressure, while on the other hand it is ensured that the sleeve is satisfactorily moved backwards when the male part is thrust into the other part of the coupling.

Further details and advantages of the invention will be found in the following description of a specific embodiment referring to the drawing.

FIG. 4 is a partial section on the line IV—IV of FIG. 3 during plugging in.

Figure 1:
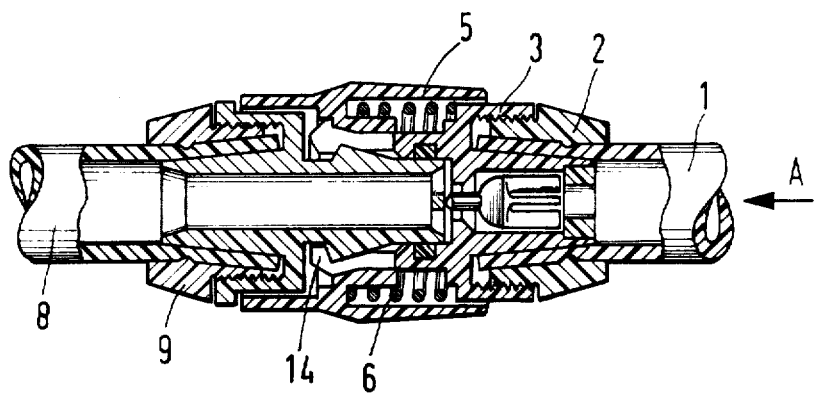
FIG. 1 is an axial section of a further embodiment of a plug-in coupling in the plugged-in condition in accordance with the invention.
Figure 2:
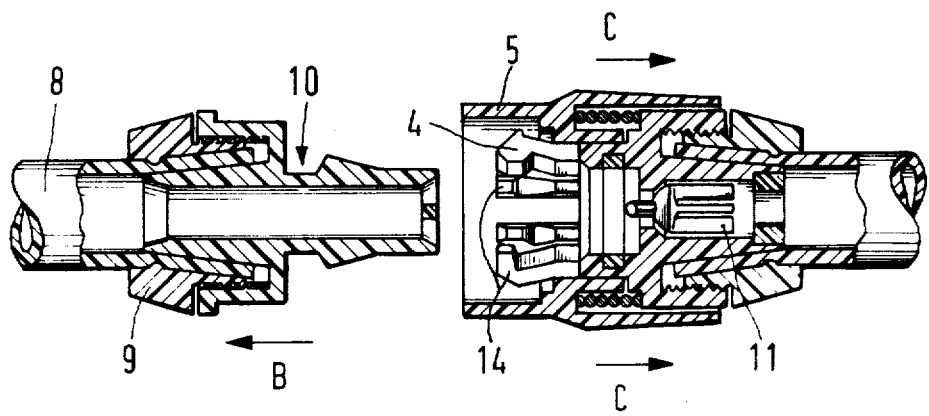
FIG. 2 shows the same coupling with the two parts separated.

The first embodiment of the invention is now described in what follows with reference to FIGS. 1 to 6.

The coupling is connected with the hose end by means of a gripping part connected with the female part 3, while the other hose end 8 is fixed on the conical connecting spigot of the male part 10 by means of the screwed-in gripping part. The male part 10 has a double-conical bead which cooperates with the holding fingers on locking the coupling in a manner to be described below.

The direction of water flow is indicated by arrow A. On the female part 3 a sleeve part 5 is provided which can slide in the longitudinal direction and which is normally pressed into the position shown in FIG. 1, in which the two coupling parts are locked together, owing to the action of the helical comprission spring 6.

Reference numeral 11 denotes the valve body of a check valve.

Figure 3:
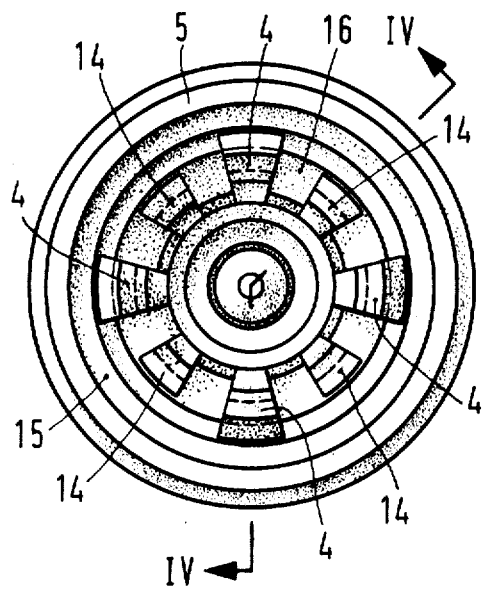
FIG. 3 is a plan view of the holding fingers of the receiving part of this coupling on a larger scale.

As can be seen from FIG. 3 eight fingers are provided which are denoted by reference numerals 4 to 14, the holding fingers 4 of the one group alternating with the fingers 14 of the other group. The fingers 14 have the task of pushing back the sleeve 5 at the beginning of plugging in and for this purpose are suitably shaped; in what follows the fingers 14 were therefore be referred to as driving or sliding fingers. The oblique inwardly facing surface 17 of FIG. 14 are slightly offset forwardly, or to the left from the rearwardly facing holding faces of fingers 4 so that the holding operation is only performed by the fingers 4. This ensures that the sleeve cannot be forced back or to the right via the oblique outer faces of the fingers 14 when a tension force is applied to the two coupling parts, which might undesirably cause the conical face of part 10 to force finger 14 outward.

Figure 4:
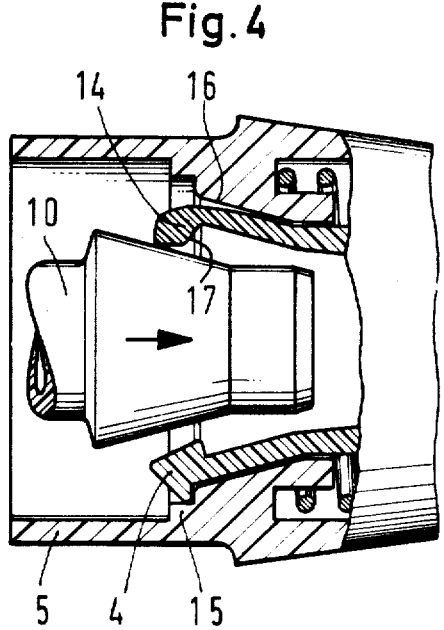
Figure 5:
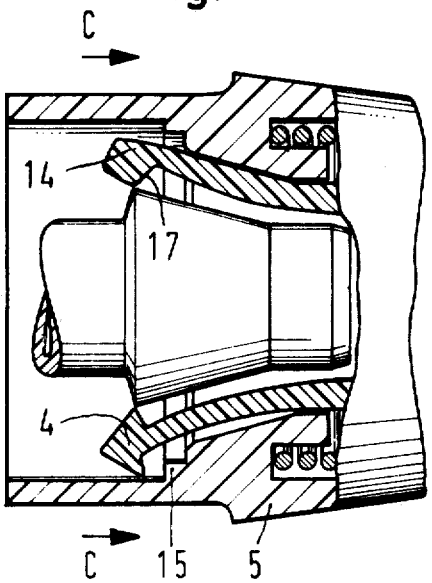
FIGS. 5 and 6 show the coupling part somewhat later, that is to say at the end of coupling the two parts together.
Figure 6:
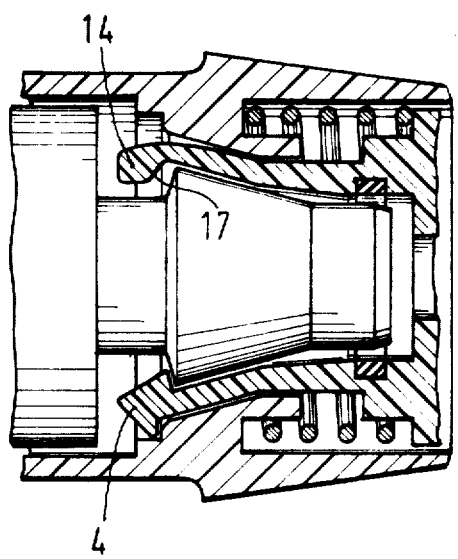

As can be seen from FIGS. 4, 5 and 6, the driving fingers 14, unlike the holding fingers 4, do not have any external radially outwardly extending holding projections. On the other hand, the driving fingers 14 have a slightly curved external face which as shown in FIGS. 4 and 5 cooperate with the internal oblique face 16 of the sliding sleeve 5. As can be seen from FIG. 4, the interior radially inwardly extending projection of each driving finger 14, i.e. the projection which carries surface 17 extends more in a forward direction, i.e. to the left in FIG. 4 than the radially inwardly extending holding projection of each holding finger 4. Each finger 4 has an external radially outwardly extending holding projection. In the uncoupled condition of the coupling, the outward projection is limited as regards outward movement by an interior cylincrical annular shoulder 15 on the sliding sleeve 5. The stronger construction of the front or left hand sides of the radially inward projections of the fingers 14 ensures that the sleeve will only be moved back on the introduction of the male part 10 when the radial spreading out of the fingers 4 is possible. The plugging operation is carried out as follows:

If in accordance with FIG. 4 the male part 10 is introduced in the female part, the conical face of the male part first of all only engages the driving fingers 14 so that these come to abut against the oblique face 16 of the sliding sleeve 5 and then push it a small distance to the right of up to 2 millimeters. In this case the holding fingers 4 slide from the inner annular shoulder 15 of the sleeve so that when during the further course of the coupling operation they contact the conical face of the male part 10, a radial movement out of the way in an outward direction is possible as is shown in FIG. 5. As is shown the interior holding projections of the driving fingers 14 are larger than the holding projections of the holding fingers 4. When the male part 10 has been introduced completely as shown in FIG. 6, the fingers 4 and 14 snap owing to their own resilience into the locked position.

The above construction of the holding fingers in accordance with the invention ensures that both on plugging in and also on undoing the coupling parts the frictional faces which slide over one another slide freely so that the frictional forces to be overcome are reduced, while nevertheless in the coupled condition locking is also possible even in the case of substantial internal water pressure; the greater holding pressure is particularly facilitated owing to the feature that the abutment shoulder 15 does not have any oblique face.

Figure 7:
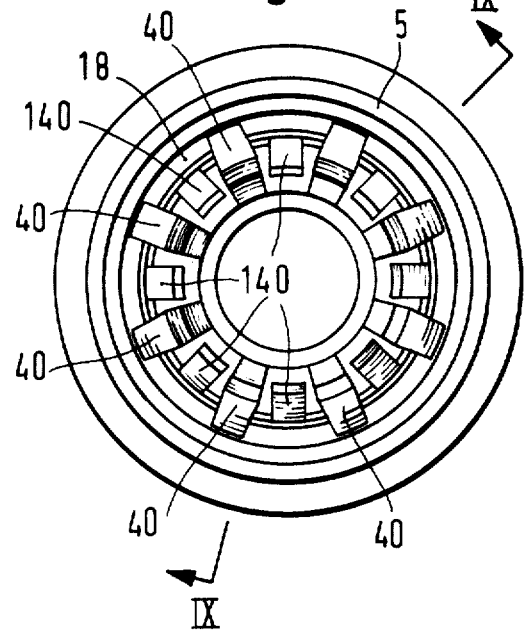
FIG. 7 shows, corresponding to FIG. 3, a plan view of the female part on the line IV—IV of FIG. 9
Figure 8:
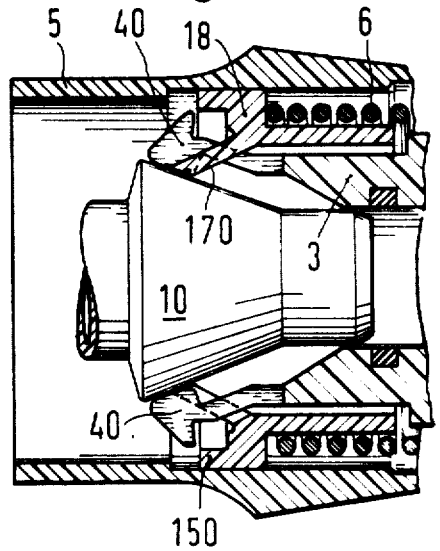
FIG. 8 is an axial section of the initiation of the locking procedure on introducing the male part.
Figure 9:
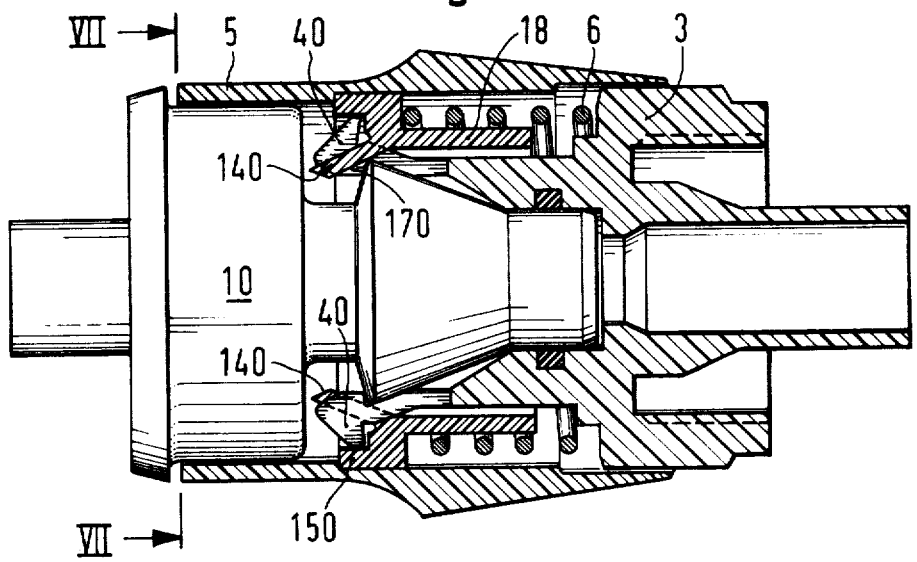
FIG. 9 is a section on the line IX—IX of FIG. 7 and shows the coupling parts in the locked position.

In the case of the second embodiment of the invention shown in FIGS. 7 to 9 within the external sliding sleeve 5 there is an additional sliding ring 18 which is engaged by the outer end of the helical spring 6 and which in turn comes to abut against an internal shoulder of the sliding sleeve 5 and entrains the latter into the outer position as shown in FIG. 9. The sliding ring is moreover guided along the cylindrical inner wall of the outer sleeve 5 and carries the sliding fingers 140. Moreover the sliding ring 18 is provided with the internal cylindrical annular shoulder 150 against which the external holding projections of the holding fingers 40 come to abut as shown in FIG. 9.

The driving fingers 140 arranged on the sliding ring 18 are in the form of flat somewhat inwardly and obliquely projecting lugs, while the holding fingers 40, similar to the arrangement in the embodiment of FIGS. 1 to 6, have inner and outer holding projections and are arranged on the female part 3. As can be seen from FIG. 7, the fingers 140 are each arranged between the two holding fingers 40.

Before introducing the male part 10 into the female part, the sliding fingers 140 extend somewhat to the front or left of the holding fingers 40. On pushing the male part 10 into the female part the driving fingers 140 thus come first into contact with the conical face of the male part 10 so that the sliding ring 18 is pushed back into the position shown in FIG. 8 in which the holding fingers 40 can spread outwards. On pushing the male part 10 further into the female part there is then a locking as is shown in FIG. 9, the holding fingers 40 fitting behind the conical shoulder of the male part 10 on the one hand and being locked by the external annular shoulder 150 provided on the sliding ring 18 on the other.

In order to undo the coupling part, one slides the external sleeve 5 (to the right in the direction of FIG. 9) so that the lugs 140 can slide with their inner faces 170 with slight friction on the conical part of the male part and the holding fingers 40 are released from the annular shoulder 150 so that when one withdraws the male part 10 from the receiving part 3, the holding fingers can spread in an outward direction and thus release the male part.

As is shown, with this construction there is the advantage that on the plugging-in of the male part the external sleeve 5 does not have to be displaced with the hand. It is also possible to hold the external sleeve 5 with the hand without the plugging-in operation being hindered. There is also the further advantage that both plugging-in and also the undoing of the coupling is particularly easy to perform.

Preferably all parts of the coupling are made of synthetic resin with the exception of the helical spring 6.

What we claim is:

1. A plug-in coupling for a hose, comprising:

a male part having a bore therethrough attachable to one hose end and having a conical face inserted narrowed end first into a coupling female part; said conical face tapering wider to an engagable conical shoulder;

a female part attachable to another hose end, said female part comprising a plurality of driving fingers and a plurality of holding fingers, all extending over said male part conical face;

said holding fingers each including radially inwardly extending projections which engage and are moved radially outward by said conical face when said male part is inserted and which engage said male part conical shoulder and hold said male and female parts together upon full insertion of said male part; said male part conical shoulder and said conical face forming an obtuse angle therebetween;

a shiftable external sleeve connected to said female part; said sleeve having an interior inwardly facing wall; said sleeve carrying blocking means which are engagable by said holding fingers as those said fingers move radially outward for blocking said outward movement of said holding fingers, which blocks both insertion of said male part and removal of said male part once it has been inserted;

said driving fingers each including a projection which engages and is moved radially outward by said conical face when said male part is inserted; said driving fingers each including means engaging and pressing upon said sleeve as said drive finger projection is moved outward; the dimension of the opening defined by said sleeve interior wall being such that said drive fingers shift said sleeve in a first direction away from said male part as said drive fingers move radially outward; said sleeve blocking means being so positioned with respect to said holding fingers as to be moved away from a position where said blocking means is engagable by said holding fingers when said sleeve is shifted in said first direction; after insertion of said male part, said sleeve being shiftable in a second direction opposite said first direction and said sleeve wall engaging and pressing said driving fingers radially inwardly, and said sleeve blocking means also engaging said holding fingers moving them radially inwardly to engage said conical shoulder.

2. A coupling in accordance with claim 1, wherein said means of said driving fingers for engaging said sleeve comprises an exterior surface on each said driving finger that is moved into contact with said sleeve interior wall.

3. A coupling in accordance with claim 2, wherein said blocking means carried by said sleeve comprises an annular shoulder on said sleeve and said holding fingers include radially outwardly extending projections for engaging said annular shoulder.

4. A coupling in accordance with claim 2, wherein said driving fingers each include a radially inwardly extending projection for engaging said male part conical face as said male part is inserted; said driving fingers being of a length, as compared with said holding fingers, and said inwardly extending projections of said driving fingers being so positioned with respect to said inwardly extending projections of said holding fingers that said driving finger inward projections extend past and are out of contact with said male part conical face and shoulder when said male part is inserted.

5. A coupling in accordance with claim 2, wherein said holding and said driving fingers are arranged about said female part to alternate with each other about said sleeve;

spring means between and engaging said sleeve and said female part to drive said sleeve in said second direction opposite said first direction.

6. A coupling in accordance with claim 1, further comprising an internal sliding ring which is connectable with said sleeve to move therewith; said driving fingers being carried by said sliding ring;

spring means between and engaging said sliding ring and said female part to drive said sleeve in said second direction opposite said first direction.

7. A coupling in accordance with claim 6, wherein said sleeve interior wall is normally engaged by said sliding ring; said sleeve interior wall includes an abutment positioned to be engaged by and being engaged by said sliding ring as said spring means presses upon said sliding ring.

8. A coupling in accordance with claim 6, wherein said blocking means carried by said sleeve comprises an annular shoulder on said sliding ring and said holding fingers include radially outwardly extending projections for engaging said annular shoulder.

9. A coupling as claimed in claim 6, wherein said holding fingers are arranged about said sleeve and said driving fingers are arranged about said sliding ring so that these said fingers alternate with each other about said sleeve and said male part.

10. A coupling in accordance with claim 6, wherein said driving fingers are in the form of generally flat lugs extending generally toward said male part and extending in a direction obliquely inward with respect to said sleeve; said driving finger projections being the ends of said driving fingers for contacting said male part conical face.

11. A coupling in accordance with claim 10, wherein said sliding ring is so positioned, said driving fingers are so obliquely inclined and said driving finger ends are so positioned with respect to said inwardly extending projections of said holding fingers that said driving finger ends extend past and are out of contact with said male part conical face and shoulder when said male part is inserted.

* * * * *